United States Patent [19]

Da Silva

[11] 4,091,569

[45] May 30, 1978

[54] PROCESS FOR THE OBTAINING OF SOUND SUGAR CANE GEMMAS FOR THE CONTROL OF THE BLIGHT OF SUGAR CANE STUMPS LEFT AFTER CUTTING AS WELL AS THE GEMMAS OBTAINED BY SAME PROCESS

[75] Inventor: Wilson Marcelo Da Silva, Piracicaba, Brazil

[73] Assignee: Cooperativa Central dos Produtores de Acucar e Alcool do Estado de Sao Paulo, Sao Paulo, Brazil

[21] Appl. No.: 731,515

[22] Filed: Oct. 12, 1976

[30] Foreign Application Priority Data

Oct. 9, 1975 Brazil .................................. 7506625

[51] Int. Cl.$^2$ .............................................. A01G 1/00
[52] U.S. Cl. ............................................. 47/58; 21/2
[58] Field of Search .................... 47/58, DIG. 9; 21/1

[56] References Cited

PUBLICATIONS

Plant Diseases, Yearbook of Agriculture, 1953, p. 535.

*Primary Examiner*—Robert E. Bagwill
*Attorney, Agent, or Firm*—Emory L. Groff, Jr.

[57] ABSTRACT

A process for the obtaining of sound sugar cane gemmas for the control of the blight of sugar cane stumps left after cutting, consists of cutting transverse disc shaped sections from selected pieces of sugar cane stalks containing gemmas, subjecting them to a thorough uniform therapeutic heat treatment to destroy any disease causing agents, planting them in pre-germinated beds with a poor substratum in organic material, and covering the beds with a porous material for germinating the gemmas.

6 Claims, No Drawings

PROCESS FOR THE OBTAINING OF SOUND SUGAR CANE GEMMAS FOR THE CONTROL OF THE BLIGHT OF SUGAR CANE STUMPS LEFT AFTER CUTTING AS WELL AS THE GEMMAS OBTAINED BY SAME PROCESS

The present invention described herein has for an object a process for obtaining sound sugar cane gemmas for the control of the blight of sugar cane stumps left after cutting. This process will be effective, in a substantially 100 percent proportion of the times, when the gemmas are given the universally used thermotheraputic method of treatment. The blight disease occurs in stalks or culms previously cut from copses or fields of sugar cane, where the blight thrives. The object of this invention is to obtain sound disease free gemmas for the purpose of sowing to raise healthy sugar cane.

The stumps left after cutting the cane are extremely susceptible to contamination by the blight and this is no doubt the most damaging disease in all regions where sugar cane is cultivated.

External symptoms of the disease are difficult to identify, since a reduction in size of the plant may be caused not only by the disease, but by planting and climatic factors. Internal symptoms of the disease are found only in some varieties. Therefore, little notice has been paid to the disease and the efforts to control it are in a relatively rudimentary stage.

The control of said disease made by the way of the planting of stronger varieties has until now proved itself infeasible due to be scarcity of such varieties. The roguing or culling of diseased plants, successfully adopted in the control of certain diseases, does not work in the case of the stump blight, because of the absence of external symptoms. The thermotherapy, that is, the destruction of the etiological or disease causing agent by heat, has been, due to the conventional systems, up to a certain point, a palliative or helpful practice in the control of said disease. When this practice is based on the treatment of the whole culm or stalk or small or stalk sections, a certain percentage of culms is not reached by the treatment, thus failing to eliminate the disease.

The reasons for this lies basically on the fact that as a rule the culms vary much in diameter even in the same variety, and considering that culms are bad heat conductors, it results that thinner culms receive more quickly in their cores the heat necessary to destroy the or disease causing agent then those of greater diameter. Thus, at the end of the period of treatment, micro organisms which have not been destroyed, remain and reproduce again to cause a complete contamination in a new planting. In many cases this problem is almost impossible to solve due to the crust, whose structure, changing from variety to variety, delays the heat penetration into the culm core.

Other reasons can be listed, such as the fact that the thermal treatment made by conventional systems on large masses of material and relatively compact masses results in difficulty in running water uniformly among the culms, thus preventing proper treatment of those placed in the middle of the lot. This also requires thermotheraputic equipment of huge size making it practically impossible to obtain perfect control of the temperature at all points in the thermal bath.

The process disclosed in the present invention abolishes all the factors that in the conventional systems act in a negative way towards the disease control. Experiments done reveal that this process besides having several advantages over the old ones, permits forthwith the identification of line gemmas, and consequently the rejection of the useless ones, that is, of those which did not survive to the thermotheraputic treatment.

The process lies basically in the formation of the gemmas from the culms or stalks of cane. The gemmas are formed by cutting transversely of a stalk in two spaced places to form a disc-shaped section, having the crust or hard outer part of the cane stalk on its outer periphery and the parenchyma or pith on the inner area. The pith will be exposed on the front and rear faces of the section and it will be cut to include the buds which will be sprouted to start a new plant. The sections will be selected to be substantially uniform in size, so that they will be uniformly and completely penetrated by heat when subjected to thermal treatment so that the etiological agent causing the blight disease will be destroyed with proctically complete efficiency.

For the gemma's formation the culm or stalk is preliminarily cut in its length, eliminating thus the problem of the crust's thermic conductibility. This way, only the part which contains the gemma remains with the crust, which does not hinder the heat action on gemma since the gemma is external to the crust.

The sectioning of the discs containing gemmas is accomplished by proper cutting means, after which such gemmas, thus isolated, are inspected for the rejection of those with defects and borers, and then subjected, by means of a proper thermotheraputic unit to water at a predetermined temperature for a predetermined time, chosen to destroy the disease causing agent.

Thus, with this process, the gemmas treated weigh approximately 1/40 of the weight of the material treated by the conventional methods. For example, 1000 gemmas weigh 4 kilos, more or less, when using the instant process, whereas, in a conventional system, the excess material that it treated weighs 120 kilos, more or less. Thus, a much smaller amount of water is necessary for the thermotheraputic treatment to obtain perfect control of the temperature thereof.

After the period prescribed for treatment, the gemma carrying discs are taken from the thermotheraputic unit and treated with a solution of Benlate, using 30 g. for each liter of water during 10 minutes. The discs can then be stored for 3 days without destroying their germinative capacity, in a 1:10 chlorine solution, or they may be immediately sown in pregerminative beds to promote the germination of the gemmas, since direct planting in the fields is inadvisable on account of the small nutritional reserve in the disc and gemma assembly.

The pre-germinative beds are preferably made of brick, measuring 1 meter wide, of variable length, and 25 cm. deep. A substratum made of sand of medium to thick texture, is placed in the bottoms of the beds.

The use of such substratum, which is poor in organic material, has the purpose of avoiding as much as possible any micro-organisms that might hinder the gemma's germination.

The seeding of the gemma carrying discs in pre-germinative beds can be done without any substantial distance between the same, so that each $m^2$ of pre-germinative bed bears approximately 1.600 gemmas for discs which are approximately, 20 mm in diameter. After seeding, a sand layer of more or less 1 cm high is put upon the discs which are periodically watered. As soon as the first or sprouts appear, foliaceous fertilizers are necessary twice a week at evening. These fertilizers including macro and micro nutrients.

Since it is necessary to carry the recently germinated gemmas away, an easily removable cover may be used instead of a sand cover. For example, the cover may be made of foam rubber. After the beginning of germination, such cover is removed and the recently germinated gemmas are gathered after two days. Such gemmas can be carried away in boxes, and in layers disposed over wet paper. Under such conditions the gemmas remain alive for more than 96 hours.

When scions reach in the pre-germinative beds approximately 30 cm high, they can be transplanted to the field they maybe planted 50 cm one from another and 1.50 m between furrows. Under these circumstances, when the scions are 3 or 4 months old, the stump's division technique can be employed multiplying thus the original area of the primary seedbed from 4 to 6 times, and under Brazilian conditions, within 8 months to a 1:10 multiplication.

An advantage of this process, in comparison to conventional systems is that it permits, while the others do not, the seeding of only the gemmas which have survived the thermotheraputic treatment, allowing rejection of gemmas which have not germinated, and which can be easily recognized in the germinative beds. This is a remarkable advantage considering that, although different varieties are planted, the normal amount of spoilage of gemmas under delicate temperature conditions functioning on a tenth degree margin of tolerance in Brazil, is not uncommonly 50% in each lot under treatment.

Having thus described the invention, what is claimed as new is contained in the following claims which complement and are made part of the specification.

1. Process for obtaining sound sugar cane gemmas for the control of blight of sugar cane stumps after the stalks have been cut, comprising, selecting sugar cane stalks of uniform size in natural form containing an outer crust and having pith within the crust and having bud portions or gemmas thereon, cutting the stalks into suitable lengths containing the gemmas, cutting the lengths in transverse sections to form disc shaped sections of substantially uniform size including gemmas thereon, and subjecting said disc shaped portions to a thermo-theraputic treatment by subjecting them to a predetermined uniform heat for a predetermined time to obtain a complete and uniform heating in every portion of the disc portions containing the gemmas and the pith so as to accomplish complete destruction of the blight causing agent without harming the gemmas.

2. Process for obtaining sound sugar cane gemmas for the control of blight of sugar cane stumps after the stalks have been cut, as claimed in claim 1 comprising, sowing the gemma containing sections in pre-germinative beds over a substratum poor in organic material, covering the bed with a layer of porous material of convenient thickness, watering said bed, fertilizing said bed until definite germination of the gemmas occurs, and removing those gemmas which did not survive the thermo-theraputic treatment.

3. Process for obtaining sound sugar cane gemmas for the control of blight of sugar cane stumps after the stalks have been cut, as claimed in claim 2, wherein the layer of porous material is foam rubber.

4. Process for obtaining sound sugar cane gemmas for the control of blight of sugar cane stumps after the stalks have been cut, as claimed in claim 2, wherein the substratum is sand.

5. Process for obtaining sound sugar cane gemmas for the control of blight of sugar cane stumps after the stalks have been cut, as claimed in claim 2, wherein the layer of porous material is sand.

6. Process for obtaining sound sugar cane gemmas for the control of blight of sugar cane stumps after the stalks have been cut, as claimed in claim 2, comprising removing said gemma containing sections after a period of germination, placing them over wet paper supports and stacking said supports in layers.

* * * * *